Aug. 7, 1956  F. J. FINKENAUER, JR., ET AL  2,757,760
DISC BRAKE
Filed Aug. 6, 1951  2 Sheets-Sheet 2
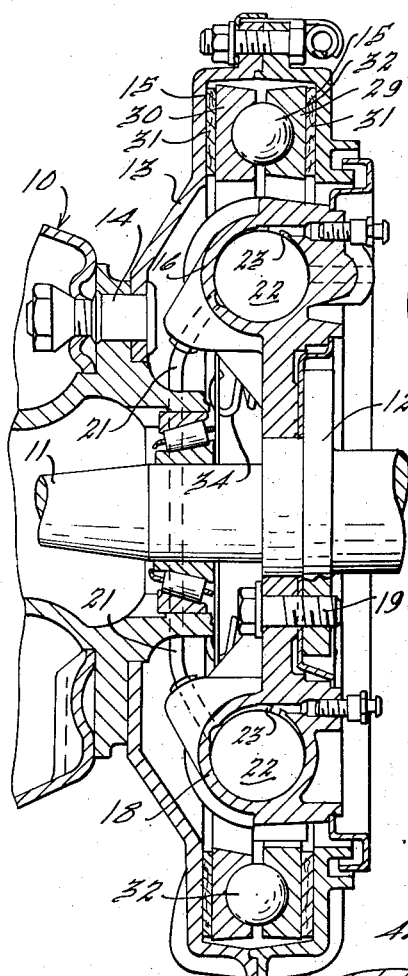
INVENTORS.
Frederick J. Finkenauer, Jr.
Herbert O. Schmidt.
BY
Harris & Harris
ATTORNEYS.

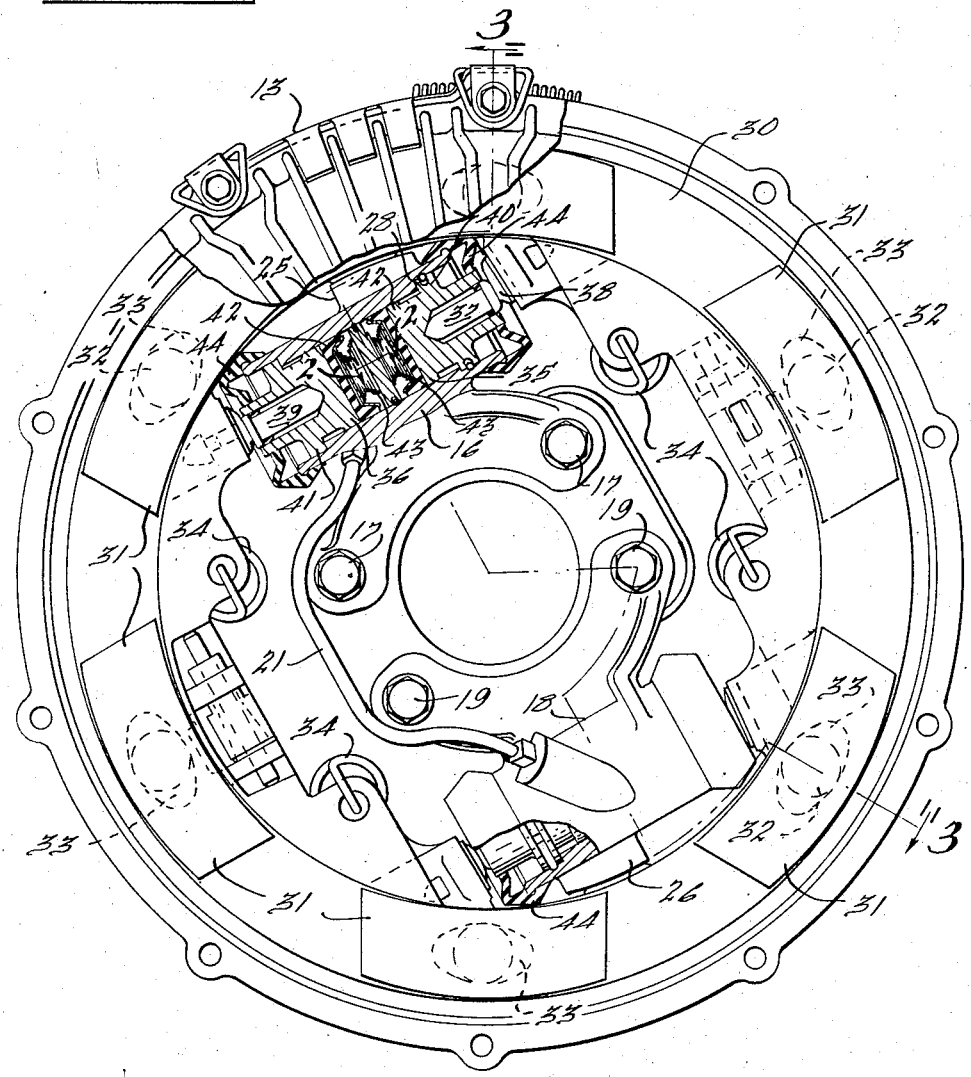

United States Patent Office 2,757,760
Patented Aug. 7, 1956

2,757,760

DISC BRAKE

Frederick J. Finkenauer, Jr., Birmingham, and Herbert O. Schmidt, Mount Clemens, Mich., assignors to Chrysler Corporation, Highland Park, Mich., a corporation of Delaware Application August 6, 1951, Serial No. 240,572

11 Claims. (Cl. 188—72)

This invention relates to improvements in brakes, and more particularly to a disc type brake which can be applied to the wheel of a motor vehicle although not so limited in its use.

In a disc type brake including a pair of discs, the braking action can be initiated by relative rotation of the discs whereupon cam means operate to relatively axially move the discs into engagement with the part to be braked which, for example, rotates with a vehicle road wheel. The brake is preferably one which is self-energizing when braking the rotating part in either direction of its rotation and the discs respectively function as reaction and energizing discs when braking in one direction, and this function is reversed when the braking is in an opposite direction.

An object of the invention is the provision of a brake of the above type which will operate with a minimum of elapsed time between the initiation and the completion of the braking action, and to provide a brake which is quiet and effective in its braking action.

More particularly, an object of the invention is the provision of a disc type brake in which operation of the brake is initiated by imparting relative rotation to the discs by rotating that disc which functions as the energizing disc when the part to be braked is rotating in a first direction, the reaction disc remaining rotatively stationary; and to provide for rotation of the latter disc, relative to the other disc, when the same functions as the energizing disc.

A further object of the invention is the provision of hydraulically actuated mechanism for effecting the aforesaid operation of the discs in initiating braking action, in conjunction with means yieldably opposing the action of this mechanism to initially rotate that disc which functions as the reaction disc when the part to be braked is rotating in the aforesaid first direction; and such means yielding to accommodate rotation of the last mentioned disc when the same functions as the energizing disc.

When the brake is applied to the road wheels of a motor vehicle the hydraulically actuated mechanism for each wheel brake may include pistons each of which has a motion transmitting connection, directly or indirectly, with a respective disc and is slidably received in the bore of a cylinder into which fluid is introduced under pressure, between the pistons, to so move the latter as to impart rotation to the discs. The invention provides for restraining one piston against initial fluid pressure actuation while accommodating action of the other piston, such one piston being connected with that disc which functions as the reaction disc for braking forward movement of the vehicle. Such restraint is exercised by a spring detent or abutment, preferably active between such piston and the cylinder.

When the discs engage the rotating wheel part to be braked a rotative force is applied thereto and a piston is moved against a reaction stop therefor. As a further feature of the invention, the aforesaid restraining means for the one piston also acts to urge and releasably retain such piston against the stop therefor, and is yieldable to release such piston for fluid pressure action to rotate the disc connected therewith in order that the latter disc may function as the energizing disc in braking reverse or backward vehicle movement.

Other objects and advantages of the invention will be more apparent from the following description taken in connection with the accompanying drawings, in which:

Fig. 1 is an elevational view, partly in section, showing the invention embodied in the brake for a typical vehicle road wheel, parts being broken away to show the underlying structure.

Fig. 2 is an enlarged fragmentary view of the cylinder shown in Fig. 1.

Fig. 3 is a cross-sectional view taken on the line 3—3 of Fig. 1.

Fig. 4 is an enlarged, fragmentary sectional view of the spring detent connection between the piston and cylinder, the parts being in the Fig. 1 position.

Fig. 5 is a view similar to Fig. 4 but showing the released position of the detent relative to the piston and cylinder.

Fig. 6 is a view similar to Fig. 4 but showing a modification of the detent connection.

Referring to the drawings, the brake is illustrated as applied to a steerable vehicle road wheel, generally designated by the numeral 10, mounted on a spindle 11 of a knuckle 12. A housing 13 is secured by bolts 14 to the wheel 10 for rotation therewith and has opposed friction faces 15. A first cylinder 16 is secured by bolts 17 to the knuckle 12 and a second cylinder 18 is secured by bolts 19 to such knuckle, it being understood that in a non-steerable road wheel these cylinders would be bolted to the housing for the axle of such wheel. The cylinders 16 and 18 are substantially identical, each having a fluid inlet as typified by the opening 20 for the cylinder 16, as shown in Fig. 2. Fluid under pressure is received in the cylinder 16 from a master cylinder, not shown, but of the type illustrated in U. S. Patent 1,988,395, and transmitted through a conduit 21 to the cylinder 18. Each cylinder 16, 18 is divided into compartments, as shown in cylinder 16, by a disc 22 retained in position by an open-ended snap retainer ring 23 seated in a groove in the external periphery of the disc and the internal surface of the cylinder, as more particularly shown in Fig. 2. The diameter of the disc 22 is slightly less than the diameter of the cylinder bore in order to provide a space shown at 24 in Fig. 3 between the outer periphery of the disc and the internal surface of the cylinder bore and the ends of the retainer ring 23 are circumferentially separated at such space. With this arrangement there is a restricted displacement of fluid between the cylinder compartments, producing a dash-pot action as and for the purposes hereinafter set forth.

The cylinders 16, 18 are disposed in diametrically opposed relationship and at an angle to the vertical and are provided with piloting portions 25 and 26 respectively, the peripheral surface of which represents a portion of the surface of a circle. The bore of each cylinder 16, 18 has portions of relatively different diameters and abutment-forming shoulders 27 and 28.

Discs 29 and 30 are piloted on the portions 25, 26 of the cylinders 16, 18 for axial and rotative movements relative thereto, and each disc carries a plurality of segments 31 of a friction material engageable with the respective friction faces 15, 15. Each disc has a plurality of ball-receiving sockets respectively opposite the sockets of the other disc, as shown in Fig. 3, for receiving a ball 32, and each disc has a camming ramp leading from its socket as typified by the ramps 33 for the disc 29. A plurality of springs 34 urge the discs 29, 30 together, against the balls 32, accommodate relative movement between the discs, and tend to cause the same when relatively moved to return to the position shown.

The actuating mechanism for the discs 29, 30 includes pistons 35 and 36 respectively disposed in compartments of the cylinder, as typified by the showing of the cylinder 16, it being understood that for the cylinder 18 the pistons are in the reverse compartments. Each piston 35 is connected with the disc 29 by a pin 37, which extends with lateral clearance into a recess of such piston and has a generally spherically contoured and engaging a correspondingly shaped bottom surface of the recess, as typified in the cylinder 16, to permit rocking or canting of the pin. The opposite end of the pin abuts the disc 29, as shown at 38, in Fig. 1. Each piston is likewise connected with the disc 30 by a pin 39. The piston 35 has an annular flange 40 which is adapted to abut the shoulder 28 of the cylinder 16 and piston 36 has an annular flange 41 adapted to abut the shoulder 27 of cylinder 16, it being understood that the piston 35, 36 are respectively at the left and right hand ends of the cylinder 18.

A flexible, cup-shaped member 42 provides a seal between each piston 35, 36 and the cylinder bore and is urged into sealing relation by springs 43 which abut the disc 22. A dust seal 44 is provided for each end of the cylinders 16, 18.

Fluid under pressure from the master cylinder is admitted through opening 20 into the cylinder 16 between the pistons 35, 36 and through conduit 21 to the cylinder 18 between the pistons therein. The housing 13 rotates in a counterclockwise direction as viewed in Fig. 1 where the vehicle is moving forwardly. With the brake construction thus far described, fluid pressure in the cylinders 16, 18 would move the pistons 35, 36 in axially opposite directions, away from the shoulders 28, 27, and the pistons acting through the pins 37, 39 would rotate the discs 29, 30 in opposite directions, that is, the disc 29 would be rotated clockwise as viewed in Fig. 1. In response to this relative rotation each ball 32 would ride onto a cam ramp 33 and axially spread the discs into engagement with the rotating housing 13.

The discs 29, 30 when so engaged with the housing would rotate therewith, counterclockwise as viewed in Fig. 1 and the disc 29 acting through the pin 37 would return pistons 35 into engagement with the cylinder shoulders 28. This return movement of pistons 35 would be retarded by the dash-pot effect of the discs 22 in restricting displacement of fluid from the compartment of the cylinders receiving the pistons 35 to the other compartment. Thus, there is a lag or undue delay in braking due to the initial rotation of the disc 29, away from its abutment and the return thereto, with or without the dash-pot retardation. The dash-pot would prevent the undesirable noise incident to engagement of piston flange 40 with cylinder shoulder 28.

The main object of the invention is to eliminate the lag or delay in brake operation by permitting the reaction disc 29 to remain in its reaction position initiating operation of the brake and relative rotation between the discs to set the balls into action is effected by rotation of the energizing disc 30. In the illustrated embodiment the foregoing is effected by restraining initial fluid pressure actuation of each piston 35, the embodiment for the cylinder 16 as shown and described being typical.

Referring to Figs. 4 and 5, the large portion of the cylinder bore receiving the piston flange 40 has an annular groove 45 and the flange 40 has a groove 46 in its outer periphery which receive an open-ended spring ring 47. This ring 47 acts as a spring detent between the stationary cylinder 16 and piston 35 to restrain fluid pressure actuation of the piston. The grooves 45, 46 are relatively axially offset so that the spring detent 47 acts to urge the piston flange against the shoulder 28. A master cylinder of the type shown in Patent 1,988,395 maintains a residual pressure in the wheel cylinders when the brake is inoperative and the spring ring 47 also acts as an abutment which restrains movement of the piston away from its stop shoulder 28 by the residual pressure present in the wheel cylinders.

In the operation of the brake as shown fluid introduced under pressure into the wheel cylinders will move the pistons 36 away from their respective stops 27 and acting through the pins 39 the disc 30 will be rotated counterclockwise as viewed in Fig. 1, and the pistons 35 being restrained against fluid pressure actuation, the disc 29 will not be rotated, so that relative rotation of the discs to cause the balls 32 to spread the discs axially into engagement with the housing 13 is effected by rotation of disc 30. The disc 29 remains in its energizing position, that is, it is at the limit of its movement which would be induced by its engagement with the housing 13 when the latter is rotating counterclockwise, as viewed in Fig. 1, during forward movement of the vehicle. The energizing disc 30 would also receive counterclockwise rotative force from the rotating housing, thus having the effect of unloading the pistons 36.

When braking reverse or backward movement of the vehicle the housing 13 is rotating clockwise as viewed in Fig. 1, and the discs 30 and 29 function respectively the reaction and energizing discs. After the disc 30 has been initially rotated counterclockwise and the piston 36 moved away from its shoulder 27 and the discs spread into engagement with the housing 13, clockwise rotation is imparted to the discs and disc 30 and piston 36 are returned to their illustrated positions against the retardation provided by the dashpot action of the disc 22 in restricting displacement of fluid between the cylinder compartments. This is the reaction position of the disc 30, in which it loads its actuating piston relative to fluid pressure by the rotatative force imparted by housing 13. With the piston 36 thus loaded fluid under pressure in the cylinder will move the piston against the opposition of the spring ring 47 to rotate the energizing disc 29 in a clockwise direction as viewed in Fig. 1. As the piston 35 is moved relative to the cylinder the ring 47 is cammed out of the cylinder groove into the piston groove 46 and the parts assume their respective positions as shown in Fig. 5.

When reverse braking is immediately followed by forward braking the disc 29 and piston 35 are returned to their positions as shown in Figs. 1 and 4, rotary movement imparted to the discs by the housing 13 rotating in a counterclockwise direction and the spring ring 47 again enters the groove 45. This return movement of piston 35 is retarded by the dashpot action of the disc 22 in restricting displacement of fluid between the cylinder compartments.

Braking in either forward or backward movement of the vehicle will continue as the energizing disc is moved rotatively by its fluid pressure actuated piston to cause the balls 32 to ride upon the cam ramps 33 and axially spread the discs against the resistance of the springs 34.

Referring to Fig. 6, each piston 35 has spaced parallel walls defining a groove 46' and the cylinder 16 has a groove 45' including a planar wall 48 engaging the spring ring detent 47 and acting to cam the detent out of the groove 45' into the groove 46' when the piston 35 is moved relative to the cylinder as set forth and shown in connection with the Fig. 5 showing.

What is claimed is:

1. In a brake mechanism, a rotatable part to be braked, movably mounted braking members, means for moving said members into braking engagement with said part in response to relative rotation of said members, means for relatively rotating said members including a cylinder adapted to receive fluid under pressure, pistons in said cylinder respectively connected with said members and arranged for relative movement by fluid pressure in said cylinder to relatively rotate said members, and a spring detent acting on one of said pistons operable to releasably restrain said fluid pressure movement thereof.

2. In a brake mechanism, a rotatable part to be braked, movably mounted braking members, means for moving said members into braking engagement with said part in response to relative rotation of said members, means for relatively rotating said members including a cylinder adapted to receive fluid under pressure, pistons in said cylinder respectively connected with said members and arranged for relative movement by fluid pressure in said cylinder to relatively rotate said members, and a spring detent acting between said cylinder and one of said pistons operable to releasably restrain said fluid pressure movement of said one piston.

3. In a brake mechanism, a rotatable part to be braked, movably mounted brake members, means for moving said members into braking engagement with said part in response to relative rotation of said members, a stationary cylinder adapted to receive fluid under pressure, pistons in said cylinder having a motion transmitting connection with a respective braking member and arranged for relative movement by fluid pressure in the cylinder to relatively rotate said braking members, each piston engaging with said cylinder to limit rotation of its connected braking member in response to engagement of such member with the rotating part to be braked, and a spring detent urging one of the pistons into the aforesaid engagement with said cylinder and releasably restraining said one piston against said fluid pressure movement.

4. In a brake mechanism, a rotatable part to be braked, movably mounted brake members, means for moving said brake members into braking engagement with said part in response to relative rotation of said members, a stationary cylinder adapted to receive fluid under pressure, pistons in said cylinder having a motion transmitting connection with a respective braking member and arranged for relative movement by fluid pressure in the cylinder to relatively rotate said braking members, each piston engaging with said cylinder to limit rotation of its connected braking member in response to engagement of such member with the rotating part to be braked, and a spring detent acting between said cylinder and one of said pistons urging such piston into its aforesaid engagement with said cylinder and releasably restraining said fluid pressure movement of said one piston.

5. In a brake mechanism, a rotatable part to be braked, movably mounted brake members, means for moving said members into braking engagement with said part in response to relative rotation of said members, a stationary cylinder adapted to receive fluid under pressure, pistons in said cylinder having a motion transmitting connection with a respective braking member and arranged for relative movement by fluid pressure in the cylinder to relatively rotate said braking members, each piston engaging with said cylinder to limit rotation of its connected braking member in response to engagement of such member with the rotating part to be braked, said cylinder having a groove in its internal periphery and one of said pistons having a groove in its external periphery axially offset relative to the cylinder groove when said one piston is engaged with the cylinder as aforesaid, and a deflectible spring ring in said grooves urging said one piston into said engagement with said cylinder and releasably connecting said one piston and cylinder, said spring being contractible into the piston groove in response to a predetermined operating pressure acting on said one piston to release said connection.

6. In a brake mechanism, a rotatable part to be braked, movably mounted braking members, means for moving said members into braking engagement with said part in response to relative rotation of said parts, a stationary cylinder adapted to receive fluid under pressure, a first piston in said cylinder having a force transmitting connection with a first braking member and a second piston having a force transmitting connection with a second braking member, said pistons being arranged in said cylinder for relative movement by fluid pressure acting therebetween to relatively rotate said members, a spring detent acting between said cylinder and said first piston to releasably restrain said fluid pressure movement of said first piston and said second piston being movable by said fluid pressure to rotate said second braking member relative to said first braking member to cause said means to move the braking members into said braking engagement with said rotating part, said rotating part when so engaged with said second braking member imparting a rotative force thereto in a direction to oppose fluid pressure actuation of said second piston to a degree greater than the opposition of said spring detent to fluid pressure movement of said first piston whereby the latter is moved by fluid pressure against the restraint of said spring detent to rotate said first braking member relative to said second braking member.

7. In a brake mechanism, a rotatable part to be braked, movably mounted braking members, means for moving said members into braking engagement with said part in response to relative rotation of said parts, a stationary cylinder adapted to receive fluid under pressure, a first piston in said cylinder having a force transmitting connection with a first braking member and a second piston having a force transmitting connection with a second braking member, said piston being arranged in said cylinder for relative movement by fluid pressure acting therebetween to relatively rotate said members, yieldable abutment means including an abutment carried by said cylinder and a spring movable with said one piston and engagement with said abutment to oppose said fluid pressure movement of said one piston and said second piston being movable by said fluid pressure to rotate said second braking member relative to said first braking member to cause said means to move the braking members into said braking engagement with said rotating part, said rotating part when so engaged with said second braking member imparting a rotative force thereto in a direction to load said second piston and said abutment means spring deflecting relative to said abutment in response to a predetermined operating pressure acting on said one piston to accommodate fluid pressure movement of said first piston when said second piston is loaded as aforesaid.

8. In a brake mechanism, a rotatable part to be braked, movably mounted braking members, means for moving said members into braking engagement with said part in response to relative rotation of said parts, a stationary cylinder adapted to receive fluid under pressure, a first piston in said cylinder having a force transmitting connection with a first braking member and a second piston having a force transmitting connection with a second braking member, said pistons being arranged in said cylinder for relative movement by fluid pressure acting therebetween to relatively rotate said members, a spring detent acting between said cylinder and said first piston to yieldably restrain said fluid pressure movement of said one piston and said second piston being movable by said fluid pressure to rotate said second braking member relative to said first braking member to cause said means to move the braking members into said braking engagement with said rotating part, said part to be braked when rotating in one direction and when engaged with said braking members imparting a rotative force thereto in a direction to respectively load and unload said first and second pistons relative to fluid pressure actuation, and said part when rotating in a second direction and when engaged with said braking members imparting a rotative force thereto in a direction to respectively unload and load said first and second pistons relative to fluid pressure actuation, each of said pistons reacting against said cylinder when loaded as aforesaid, and said spring detent yielding to accommodate said fluid pressure movement of said first piston when said second piston is loaded as aforesaid.

9. In a brake mechanism, a rotating part to be braked, a pair of braking discs having a neutral position relative to said part and mounted for relative axial movement to engage said part and for relative rotary movement, rotatably fixed abutment means limiting rotation of each disc in one direction incident to engagement of such disc with said rotating part, fluid pressure actuated mechanism operable to apply a force to impart relative rotation to said discs including rotation of one disc from its neutral position in a direction away from its said abutment means, means yieldably opposing operation of said fluid pressure actuated mechanism to rotate the other of said discs from its neutral position in a direction away from its said abutment means, and cam means operable in response to relative rotation of said discs to move the latter axially into engagement with said rotating part.

10. In a brake mechanism, a rotating part to be braked, a pair of braking discs having a neutral position relative to said part and mounted for relative axial movement to engage said part and for relative rotary movement, rotatably fixed abutment means limiting rotation of each disc in one direction incident to engagement of such disc with said rotating part, fluid pressure actuated mechanism operable to apply a force to impart relative rotation to said discs including rotation of one disc from its neutral position in a direction away from its said abutment means, means yieldably opposing operation of said fluid pressure actuated mechanism to rotate the other of said discs from its neutral position in a direction away from its said abutment means, cam means operable in response to relative rotation of said discs to move the latter axially into engagement with said rotating part, said rotating part when rotating in one direction and so engaged with said one disc imparting a force thereto to rotate the same to the limit provided by the stop means for said one disc, and said yielding means yielding to accommodate rotation of said other disc by said fluid pressure actuated mechanism when said one disc is rotated as aforesaid to its said limit.

11. In a brake mechanism, a part to be braked, movably mounted brake members, means for moving said members into braking engagement with said part including a cylinder adapted to receive fluid under pressure, fluid pressure actuated pistons in said cylinder respectively operably connected with said brake members, and a spring detent means releasably connecting one of said pistons with said cylinder and yieldably opposing fluid pressure actuation of said one piston, said one piston and said cylinder having relatively axially offset grooves and the spring detent means including a spring ring extending into each of said grooves, the spring ring deflecting in response to a predetermined fluid operating pressure acting on said one piston into one of said grooves to thereby release said connection.

References Cited in the file of this patent
UNITED STATES PATENTS

| | | |
|---|---|---|
| 1,701,142 | Christensen | Feb. 5, 1929 |
| 1,953,258 | Pentz | Apr. 3, 1934 |
| 2,087,392 | White | July 20, 1937 |
| 2,575,963 | Kershner | Nov. 20, 1951 |